United States Patent
Padala et al.

(10) Patent No.: US 9,032,497 B2
(45) Date of Patent: May 12, 2015

(54) SYSTEM AND METHOD FOR SECURING EMBEDDED MEDIA

(75) Inventors: Sailendra K. Padala, San Mateo, CA (US); Emma Wei, Cupertino, CA (US); Pedro Valentin Araujo, Newark, CA (US)

(73) Assignee: CBS Interactive Inc., San Francisco, CA (US)

( * ) Notice: Subject to any disclaimer, the term of this patent is extended or adjusted under 35 U.S.C. 154(b) by 698 days.

(21) Appl. No.: 13/161,191

(22) Filed: Jun. 15, 2011

(65) Prior Publication Data

US 2012/0324552 A1    Dec. 20, 2012

(51) Int. Cl.
*H04L 9/00* (2006.01)
*G06F 21/10* (2013.01)
*H04L 9/32* (2006.01)

(52) U.S. Cl.
CPC .............. *G06F 21/10* (2013.01); *H04L 9/3213* (2013.01)

(58) Field of Classification Search
CPC ............................ H04L 9/3234; H04L 9/3213
USPC .................................................. 726/6, 9, 10
See application file for complete search history.

(56) References Cited

U.S. PATENT DOCUMENTS

| | | | | |
|---|---|---|---|---|
| 6,021,491 | A  * | 2/2000 | Renaud .......................... | 713/179 |
| 7,702,794 | B1 * | 4/2010 | Hall et al. ..................... | 709/227 |
| 7,752,448 | B1 * | 7/2010 | Badenell ....................... | 713/177 |
| 8,566,461 | B1 * | 10/2013 | Jun et al. ....................... | 709/229 |
| 2001/0034714 | A1 * | 10/2001 | Terao et al. ..................... | 705/57 |
| 2003/0028653 | A1 * | 2/2003 | New et al. ...................... | 709/229 |
| 2010/0098074 | A1 * | 4/2010 | Kokernak et al. ............. | 370/389 |
| 2010/0138879 | A1 * | 6/2010 | Bird et al. ......................... | 725/76 |
| 2010/0306547 | A1 * | 12/2010 | Fallows et al. ................ | 713/178 |
| 2011/0276585 | A1 * | 11/2011 | Wagner et al. ................ | 707/769 |
| 2011/0320626 | A1 * | 12/2011 | Wong et al. .................... | 709/231 |
| 2011/0320628 | A1 * | 12/2011 | Gutarin et al. ................ | 709/231 |

* cited by examiner

*Primary Examiner* — Kaveh Abrishamkar
*Assistant Examiner* — Ngoc D Nguyen
(74) *Attorney, Agent, or Firm* — Fenwick & West LLP

(57) ABSTRACT

Set forth herein are systems, methods, and non-transitory computer-readable storage media for processing media requests in a secure way. A server configured to practice the method receives, from a media player client, a request for media content. The server requests a playback token from a playback service associated with the media content and generates a tag containing the playback token. Then the server transmits to the media player client a response to the request for media content based on the tag, wherein the media player client retrieves the media content by presenting the playback token to the playback service. The media player client can be an embedded media player or other player in a web browser. The server and the playback service can operate based on a common, pre-shared feed token. Other playback client and playback service embodiments exist.

14 Claims, 5 Drawing Sheets

SYSTEM AND METHOD FOR SECURING EMBEDDED MEDIA

BACKGROUND

1. Technical Field

The technical field relates to media distribution and more specifically to maintaining security and enforcing playback restrictions on media distribution, such as through embedded media players.

2. Introduction

Media can be distributed in many ways in an online environment. One way to handle media distribution is to provide an embedded or embeddable player to a client. For example, many web sites currently use an embedded Adobe® Flash® player, HTML5, or other plug-in based media playback architecture. These embedded players are typically very static and are independent of time, IP address, domain, user id, and so forth, even regardless of an authentication layer or a subscription layer. Thus, a malicious user can take the embedded player from the source, such as a secured page, for playback on other sites or for playback that ignores a particular content security scheme. This vulnerability makes the content less secure, because a user can play the content regardless of restrictions on the time limit, protected domains, particular IP addresses or ranges, and/or associated users.

These shortcomings hinder content distribution and cause uncertainty for content owners. Other, more secure content distribution approaches exist, but are not as flexible as web-based content distribution.

SUMMARY

Additional features and advantages of the embodiments set forth herein will be described below, and in part will be obvious from the description, or can be learned by practice of these principles. The features and advantages of these embodiments can be realized and obtained by means of the instruments and combinations particularly pointed out in the appended claims. These and other features of the various embodiments will become more fully apparent from the following description and appended claims, or can be learned by the practice of the principles set forth herein.

One way to provide security in video distribution is browser based player object embed tags extended with security information for use with video players. Example player tags include embed, object, HTML 5 video tags, and so on. The client-side player, which can be an embedded player or native player, is tied to a token associated with a web server domain, client IP address, server IP address, a pair of a client IP address and a server IP address, a user ID, and/or any other form of identifying a playback. In this distribution approach, a content server, or other entity within a content distribution network, provides a secured token bound by a time limit, IP address, domain of the website, user ID, etc. along with an encrypted video ID into an embeddable player on a website or an application. Tokens can include software tokens that are a part of a two-factor authentication security scheme to authorize the use of or access to a computing resource, such as access to a piece of streaming media on a remote server. Tokens can be part of a public-key cryptography scheme and/or an asymmetric cryptography scheme. An authentication server can generate and distribute the tokens to client-side players as needed and/or upon request from a client or other entity. Tokens can be based on a shared secret, such as a username, personal identification number (PIN), password, client playback device key, a timestamp, and/or a combination thereof. A token can be time-limited. For example, a time-limited token can allow a client-side player to fetch and play back a particular piece of media content for 24 hours, after which the time-limited token expires and must be renewed and/or replaced in order to consume content beyond that 24-hour period. Hardware tokens can functionally substitute for software tokens, but the distribution, cost, and other savings of software tokens provide many advantages, especially with large scale digital content distribution.

The web server or an application servicing an end user's video request can use a pre-shared feed token and pass parameters to a play back service, that the player also depends on, making the content distribution secure without exposing any shared secrets/keys to the client/browser. A token generator can generate and store the pre-shared feed token and a feed service and/or other distribution entity can distribute the pre-shared feed token to the server. The parameters can describe the requesting client-side player, the requested media content, and other information, such as the client IP address, the client domain, the client top-level domain, the server IP address, the server domain, a user ID, and/or the feed token. The playback service returns a playback token along with any other parameters to the web server, and the web server generates an embed/object tag with a playback token (or any other kind of video player embedding/tagging in the browser) and returns to the browser. The browser loads the video player, which then makes a call to the same playback service that issued the playback token, along with the playback token and can optionally include additional information such as a site domain, IP address, and user ID, if present. The playback service verifies the token with a copy of what it has in its store, checks the time stamp, and recharges or extends the token for another interval if needed. The playback service then optionally decrypts the video ID as necessary, proxies a call to a video content management system on behalf of the client-side player, and returns a playlist file to the client-side player including stream Uniform Resource Locators (URLs), so the player can play the content as a media stream. The stream URLs can include individual content-based or session-based stream tokens in turn to protect the stream. The encryption and decryption of the video ID is optional. The system can incorporate other types of video IDs, such as a one-way hash of the ID or mapping one ID to a completely different ID. In this way, the system can link an ID to a particular piece of media content. These approaches can accomplish similar goals without any actual encryption.

The playback service can optionally use one or more session cookies to provide playback of multiple videos within a single session, instead of checking for every video requested. Further the playback service can also verify the geographic location of the user, such as via an IP address, GPS signal, signal triangulation, or any other location indicator, to enforce geographic media distribution restrictions if needed.

The encrypted video ID can also be provided to the web server in advance of a request from a client-side player via standard video feeds or at runtime via calls like JavaScript Object Notation (JSON) so that the web server is able to appropriately handle and respond to requests from client-side players. In some use cases, the playback token can also be tied to the encrypted video ID, further providing video level security. This security approach can be applied to any browser-based video embedding tags, HTML 5 video tags, or other similar video distribution clients. An HTML 5 video tag at run time can point to the playback service with the provided token, so the playback service, after verifying the token, generates the appropriate playlist. After receiving the appropriate verified playlist from the playback service, the client-side player can begin streaming the media within the HTML 5 video tag.

Various embodiments include systems, methods, and computer program products utilizing non-transitory computer-readable storage media for secure content distribution. Some separate entities in a secure content distribution system include a web server, a media player client, a playback service, and a content management system, but other components can be included according to the spirit and scope of the principles herein. A server practicing the method first receives, from a media player client, a request for media content and requests a playback token from a playback service associated with the media content. The server generates a tag including the playback token, and transmits to the media player client a response to the request for media content, wherein the response includes the embed-object tag with the playback token, and wherein the media player client retrieves the media content from the playback service by presenting the playback token to the playback service or by streaming from an authorized URL indicated by the playback service.

A media player client transmits a request for a media playback tag associated with media content from a server, wherein the server generates the media playback tag and the playback token in coordination with a playback service. The media player client receives the media playback embed object tag from the server and requests a media playlist from the playback service associated with the media playback by presenting the playback token to the playback service. Then the media player client receives the media playlist from the playback service, and retrieves the media for playback based on the media playlist for playback to a user.

As set forth above, a playback service can provide a verified playlist to a client-side player, such as an embedded player on a web page loaded in a web browser. The playback token can also be used by a player loaded into devices like a smart phone app or any other kind of online app on devices with or without an embedding tag. The player can operate on a set-top box, a tablet, and/or any other suitable network-enabled device capable of media playback. The app can request a playback token and pass it to a player, so the player can use the playback token to cal the playback service. In this context, the playback service receives, from a web server, a request for a playback token. The web server generates the request in response to an initial user request for media playback, which is directed to the web server and not to the playback service. The playback service generates the playback token for media content associated with the first request and transmits the playback token to the web server. The web server can then respond to the initial user request with a tag that includes the playback token. Then, at a later time, the playback service receives, from the user, a media playback request. If the media playback request corresponds to the generated playback token, then the playback service provides access to the media content to the user, and if the media playback request does not correspond to the generated playback token, the playback service denies the user access to the media content. The playback service can provide access to the media content in the form of a video stream, a playlist of one or more links to portions of the media content, or any other suitable access schema.

BRIEF DESCRIPTION OF THE DRAWINGS

In order to describe the manner in which the above-recited and other advantages and features can be obtained, a more particular description of the principles briefly described above will be rendered by reference to specific embodiments thereof which are illustrated in the appended drawings. Understanding that these drawings depict only exemplary embodiments and are not therefore to be considered to be limiting of its scope, the principles herein are described and explained with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the embodiments explicitly set forth herein.

Systems, methods and non-transitory computer-readable media are set forth that secure content distribution for embedded media playback clients, such as an embedded video player in a web browser. A basic general purpose system or computing device in FIG. 1 can be employed to practice these concepts. A more detailed description of an example architecture for media content distribution will then follow. Variations shall be discussed herein as the various embodiments are set forth.

Figure 1:
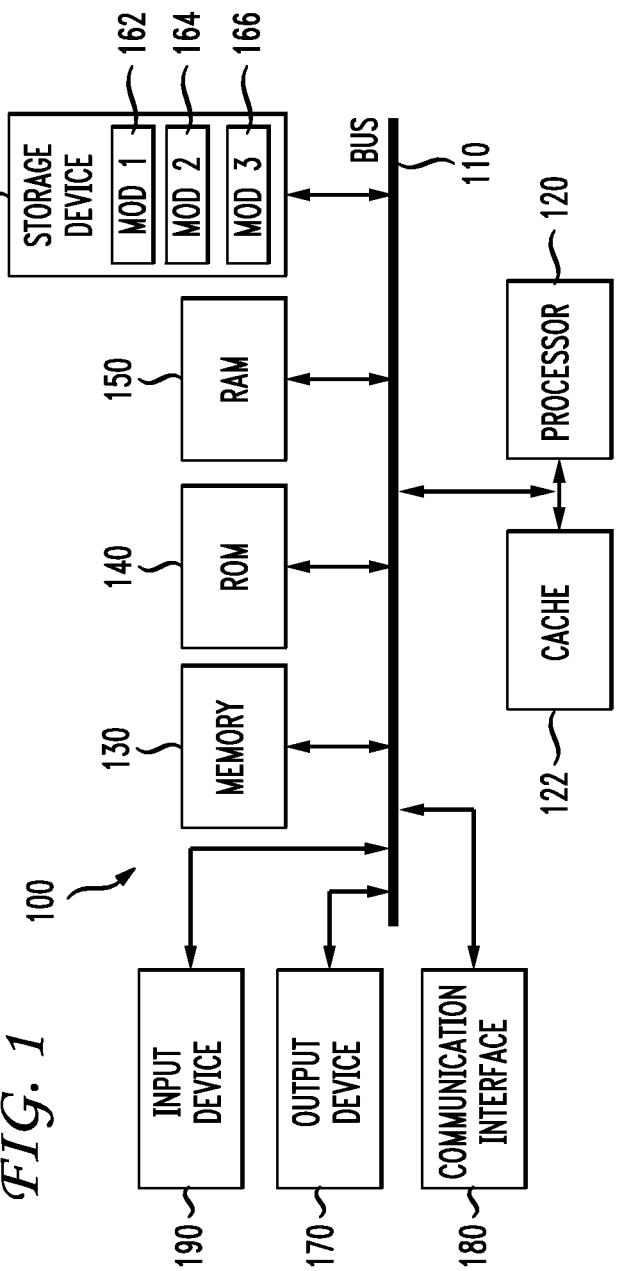
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that these principles may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having set forth some components of a computing system, the discussion now returns to secure content distribution. Securing the embed and playback may be a necessary part of placing content behind an authentication or a subscription wall. Most authentication and subscription players need to protect the embed playback in some form, as media playback should be limited or restricted entirely outside the security wall so that the embedded player cannot be used for unauthorized purposes.

Figure 2:
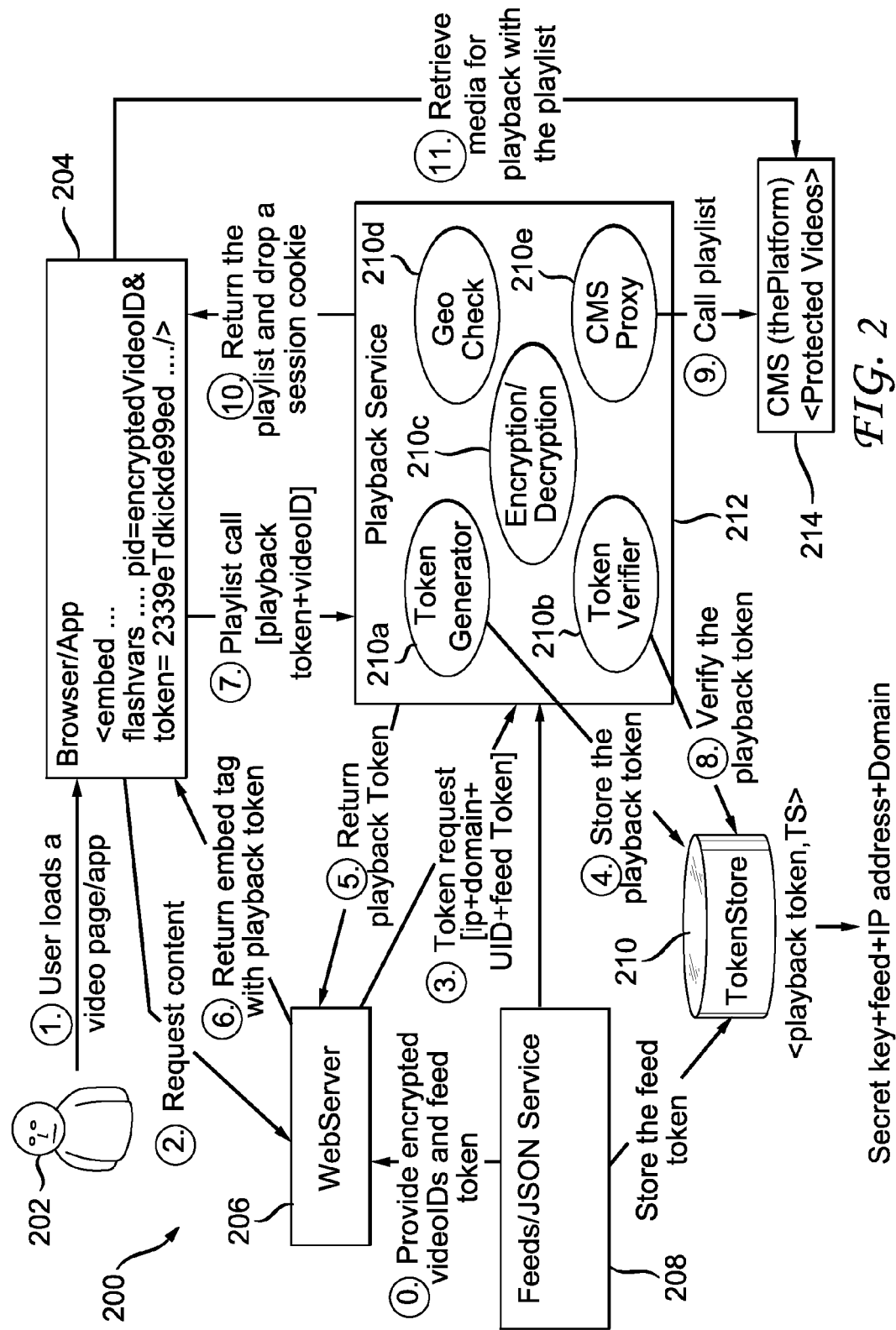
FIG. 2 illustrates an example media playback architecture.

FIG. 2 illustrates an example secure media playback architecture 200. The media playback architecture 200 is discussed in terms of video content, but the same principles apply equally to any type of digitally distributed media, such as audio, multimedia, images, text, interactive media, and so forth. Before the user requests media content, at step 0, a feed/JSON service 208 provides encrypted video IDs and/or a feed token to a web server 206 and to a playback service 212. The feed/JSON service 208 can also optionally store the feed token in a token storage 210. Then, at step 1, a user 202 loads a video page in a web browser 204, opens a video app, or triggers execution of some other client-side software. At step 2, the browser 204 requests the video from a web server 206. At step 3, the web server 206 sends a token request to the playback service 212. The token request can include multiple pieces of information, such as the IP of the requesting browser 204, the domain of the web server 206, a user ID, and the feed token from the feeds/JSON service 208 or a derivative thereof. At step 4, the playback service 212 generates a playback token via a token generator 210a, and stores the playback token in a token storage 210. The playback token can include and/or be based on a secret key, the feed token, the IP address of the requesting browser, and/or the domain of the web server 206. Then at step 5, the playback service 212 returns the playback token to the web server 206, which, at step 6, returns a tag containing the playback token or a derivative thereof to the web browser 204. The embed tag returned to the web browser is a response to the request for the video. The embed tag as a whole may be in plain text, but the playback token embedded in the tag can be encrypted, a hash of a video ID, a mapping of one video ID to another video ID, and so forth.

Then at step 7 the web browser 204, the embedded player running in the web browser 204, or an application on a smartphone or other computing appliance without a browser can analyze the tag and the playback token included in the tag, including any implied and/or passed parameters associated with the tag, to determine what call to make. Then, according to the analysis of the tokenized embed, the embedded media player in the web browser 204 makes a playlist call to the playback service 212. The playlist call can be based on the playback token and the video ID, which may be optionally encrypted. The playlist call can optionally include additional information such as the domain. At step 8, a token verifier 210b verifies, based on the token storage 210, the playback token passed from the web browser 204 via the playlist call. The playback service 212 can also include other components such as a geographic region checker 210d that verifies and enforces geographic media playback restrictions. For example, users in a particular country may be allowed to access media content, while users outside of that particular country are denied access. The geographic playback restrictions can be more geographically fine-grained, such as at a state level, city level, neighborhood level, and so forth. For example, a chain of coffee shops can provide free access to a particular Internet-based stream of an online television show to visitors at any location of the coffee shop chain, based on geographic information. In one example, the web browser 204 self-reports its location such as in a mobile browser on a smartphone reporting its position based on GPS coordinates, but the playback service 212 can also make an independent determination of location, such as based on an IP address, or the playback service 212 can confirm a self-reported location. In one aspect, the geographic region checker 210d is an optional component that is only triggered for a specific class of users. For example, if users are grouped into paid subscribers and free subscribers, then the playback service 212 may only enforce geographic restrictions for free subscribers, and not for the paid subscribers. This approach can provide more flexibility than a simple 'allowed' or 'denied' access status. For example, when the geographic check indicates that a user is at home, the user can view the content without advertising. As the geographic check indicates that the user moves further away from home, the amount of advertising can scale up to a threshold based on the distance from home. Similarly, when the user is located in an unauthorized region, the system can either deny playback to the user entirely, can require the user to purchase the content, or some other desired behavior.

Further, the playback service 212 can include an encryption/decryption module 210c to encrypt or decrypt media content, video IDs, playlist calls, tokens, and/or any other data. Various other modules can operate in conjunction with and/or in place of the encryption/decryption module 210c, such as a content ID mapping module, a module that performs a one-way hash of a video ID, and so forth.

At step 9, the content management system (CMS) proxy 210e associated with the playback service 212 calls a playlist from a CMS 214 storing protected media. The playback service 212 creates, receives, or modifies a playlist based on received information in response to the playlist call from the web browser 204 at step 7. Then at step 10, the playback service 212 returns the playlist and optionally drops a session cookie for the web browser 204. At step 11, the web browser 204 is then able to retrieve media from the CMS 214 for playback using the playlist. Based on the cookie, the web browser 204 may be able to make multiple requests for other media content beyond the media that was the subject of the initial request in step 2. Because the CMS 214 already has an established relationship of trust with the web browser 204 based on the interactions between the web browser 204, the web server 206, and the playback service 212, the CMS 214 can serve other content to the web browser 204 for the duration of the cookie without re-establishing that same relationship a second time.

While the particular layout of entities, i.e. the web server 206, the feeds/JSON service 208, the token storage 210, the playback service 212, and the CMS 214 are depicted as separate entities, all or part of their functionalities can be merged and/or split in other arrangements than those shown in FIG. 2. For example, the playback service 212 and the token storage 210 can be incorporated as separate or joined software processes and/or data on a single physical computing device. Similarly, any of the token generator 210a, token verifier 210b, encryption/decryption module 210c, geographic checker 210d, and the CMS proxy 210e can be implemented separately from but still communicating with the playback service 212. For redundancy, availability, or other purposes, each of the components shown in FIG. 2 can be replaced by local and/or distributed groups of redundant computing devices.

Figure 3:
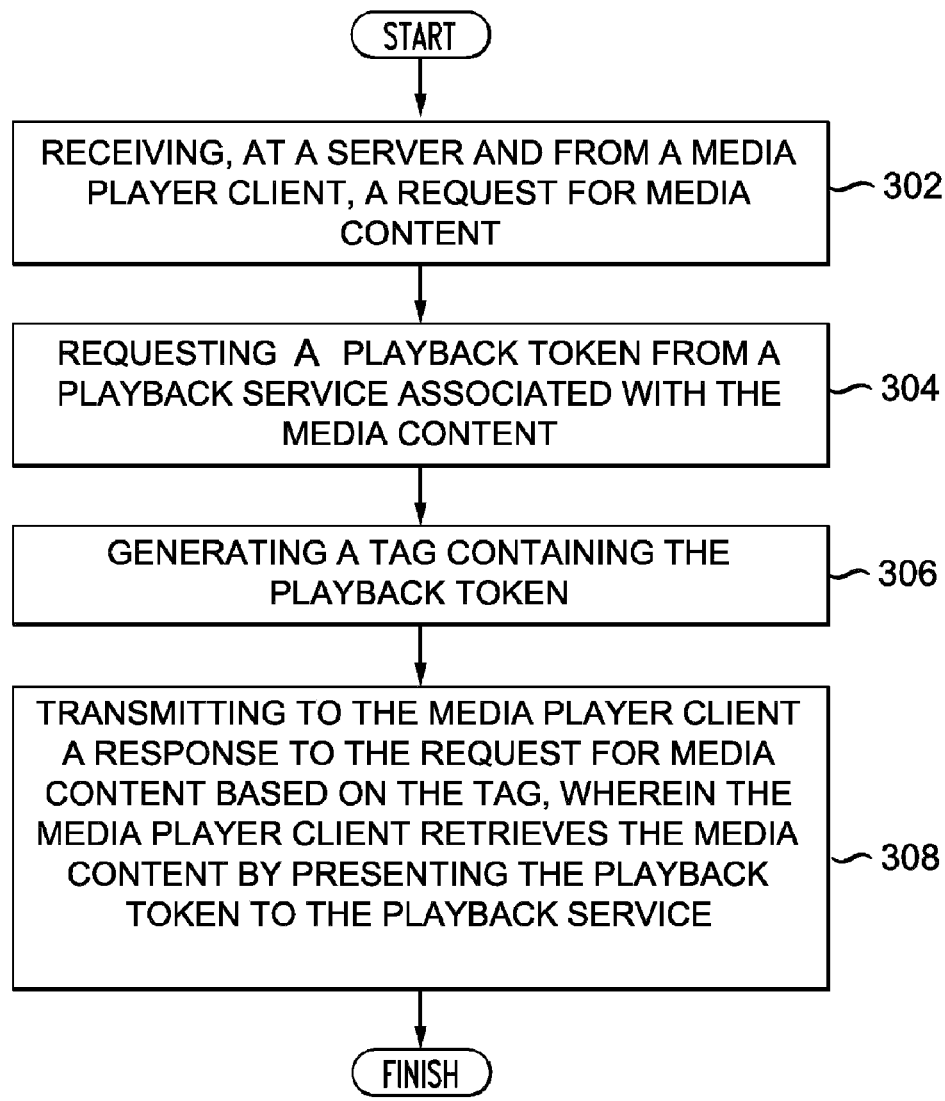
FIG. 3 illustrates a first example method embodiment from the perspective of a web server.
Figure 4:
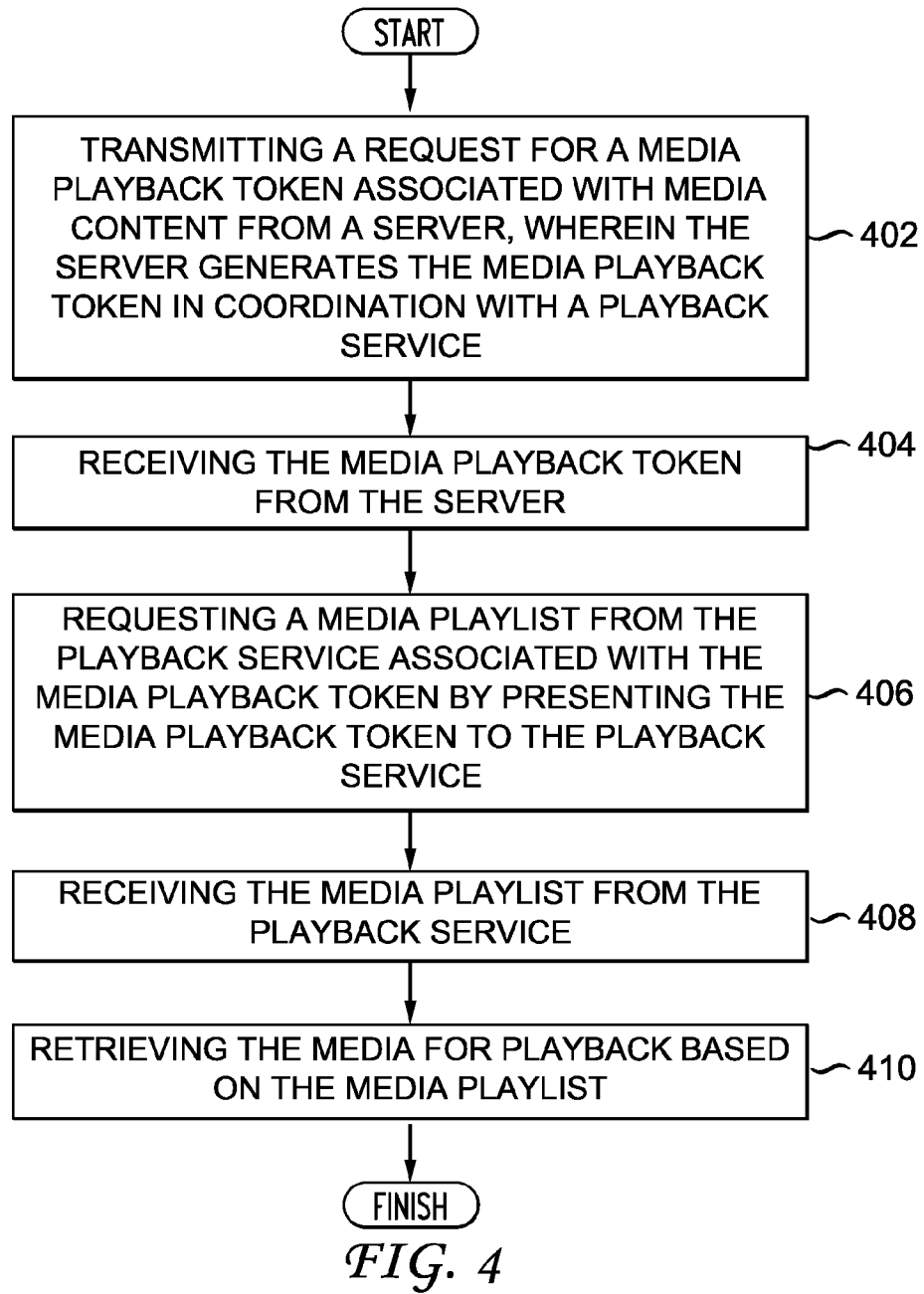
FIG. 4 illustrates a second example method embodiment from the perspective of an embedded media player client.
Figure 5:
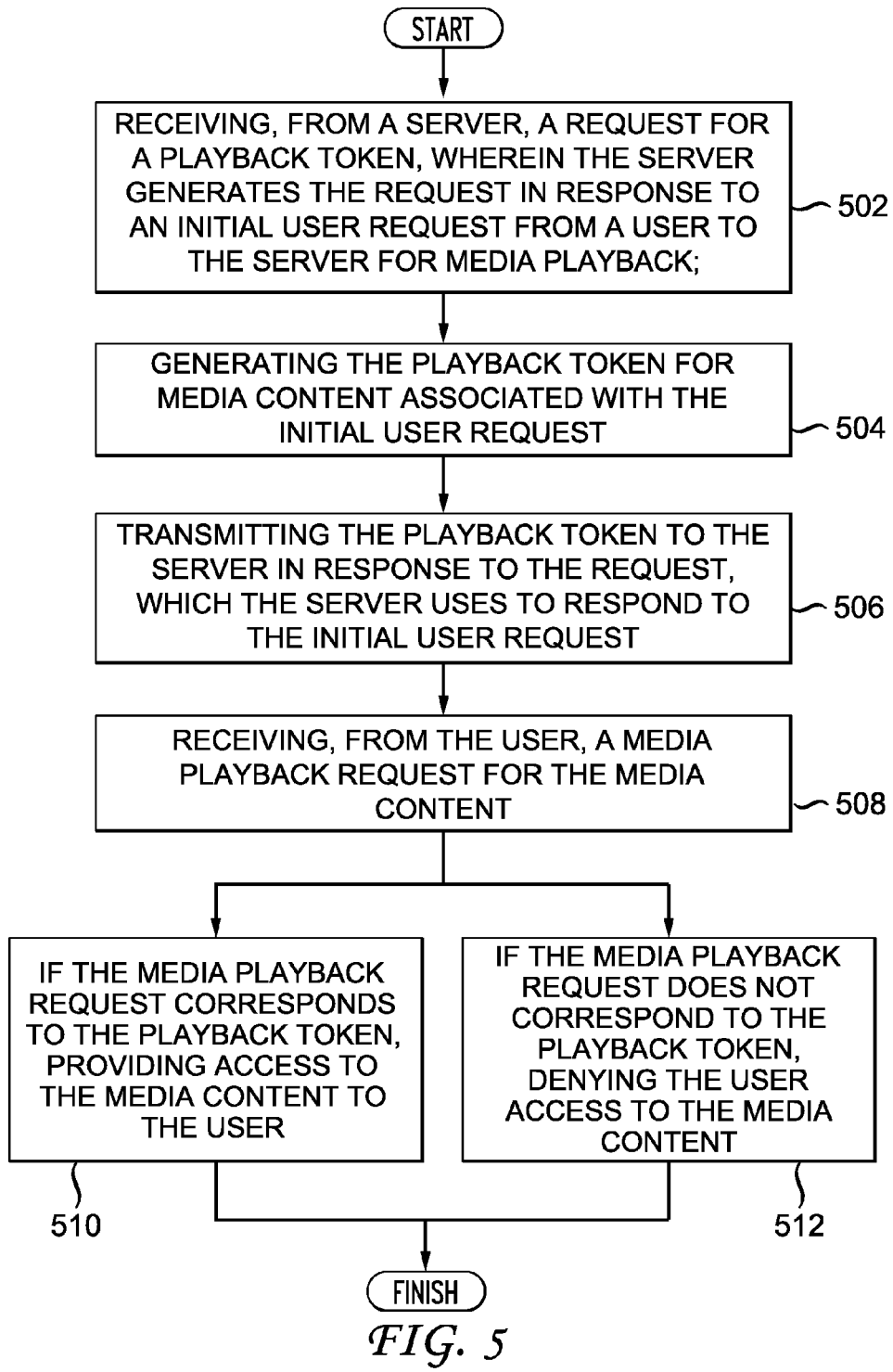
FIG. 5 illustrates a third example method embodiment from the perspective of a playback service.

Having discussed some basic system components and concepts, the discussion now turns to the exemplary method embodiments shown in FIGS. 3-5. For the sake of clarity, each of the methods is discussed in terms of an exemplary system 100 as shown in FIG. 1 configured to practice the respective method. The steps outlined herein are exemplary and can be implemented in any combination thereof, including combinations that exclude, add, or modify certain steps.

FIG. 3 illustrates a first example method embodiment for processing media requests from the perspective of a web server or other server. The server receives, from a media player client, a request for media content (302). The media player client can be an embedded media player in a web browser, an embedded or non-embedded media player in a standalone application, or some other client-side media player with network access. The request for the media content can be associated with a media consumption session for consuming multiple discrete pieces of media content. For example, the request can be for a first episode of a television show, and, after the media player client is authorized to play the first episode, the media player client is also authorized for playing any remaining episodes in that same season for a specific duration without going through the entire authorization process again. The media player client can follow a reduced complexity authorization process, which can include fewer or some minimal additional authorization steps, such as confirming an expiration date of a trusted cookie, or the media player client can go through no additional authorization. A trusted session cookie can be established to preauthorize media playback for the multiple pieces of media content for a limited time without authorizing each of the multiple pieces of media content individually.

The server requests a playback token from a playback service associated with the media content (304) and generates a tag based on and/or including the playback token (306). A token can be a cryptographic hash of a value, indicating that that value was accessible when the token was generated, but the token does not reveal what that value was. The embed tag can be derived from all or part of the playback token or can include all or part of the playback token, such as including the playback token as a parameter in the embed tag. The server and the playback service can incorporate a common pre-shared feed token, as set forth above, to ensure that each can trust the identity of the other. The server can transmit to the playback service a time limit, an IP address, a domain, a user identifier, and/or an encrypted media identifier associated with the media content as part of the request for the playback token. Accordingly, the playback token can incorporate the time limit, the IP address, the domain, the user identifier, and/or the encrypted media identifier associated with the media content. The server relays the tag to the media player client. The media player client can then continue the process of retrieving media content by presenting to the playback service the token and the video ID and can optionally present additional information such as the time limit, the IP address, the domain, and the user identifier. Further, the playback service can restrict the media player client, based on the playback token, other information received from the media player client, and/or any other information describing the media player client from other sources, to play the media content according to the at least one of the time limit, the IP address, the domain, the user identifier, and the encrypted media identifier associated with the media content. For example, the playback service can determine a location of the media player client and authorize the media player client to play the media content based on the location. The playback service can alternatively rely on a determination of the location of the media player client previously made and reported by the client itself and/or by another entity. For example, if the media player client is part of a cellular network enabled device, the cellular network can report the location of the tower with which the media player client device is communicating.

Then the server transmits to the media player client a response to the request for media content, wherein the response includes the playback token embedded within a tag, and wherein the media player client presents the playback token to the playback service (308). In one example, the media player client retrieves the media content from the playback service by receiving from the playback service a playlist with stream addresses, retrieving media content pieces at the stream addresses, and playing the media content pieces. The media content pieces can be encrypted, either in advance or on-the-fly based on the request for the media content. The playback service can decrypt the media content pieces before the media player client retrieves the media content pieces. Each of the stream addresses can be associated with a different stream token. Then the media player client can use the response received from the server to retrieve and play back the media content.

FIG. 4 illustrates a second example method embodiment for secure media content playback from the perspective of an embedded media player client, such as a media player running on a page loaded in a web browser. The browser transmits a request to play back media content from a server, wherein the web server generates a media playback tag containing a token in coordination with a playback service (402). The playback service can act as a gateway to a media content management system (CMS) hosting the requested media. The server can generate the media playback tag based on a token store and communications with the playback service. The token store can contain a pre-shared feed token and/or a playback token. Tokens can be based on a secret key, a media feed token, an IP address, a domain, and/or any uniquely identifying attribute. In one aspect, the token store is a simple repository for storing and retrieving tokens. However, in another aspect, the token store contains the means for generating tokens on-demand in response to requests. The token store can perform either or both of these functionalities.

The embedded client receives the tag from the web server (404) and requests a media playlist from the playback service associated with the media playback token contained in the tag by presenting the media playback token to the playback service (406). The embedded client receives the media playlist from the playback service (408), and can then retrieve the media for playback based on the media playlist (410). The media playlist can incorporate a streaming token. For example, the media playlist can be a media manifest file indicating a set of media sub-portions, such as 10 second video clips, which the client retrieves for playback in a particular order to provide a continuous media experience. Alternatively, the media playlist can include one or more URLs specially created based on one or more token that indicate that the embedded client is authorized to access the media content. The embedded client can retrieve the media for playback from one or more sources. In one embodiment, a playlist can indicate a different token for each source from which to stream media for playback. For example, the embedded client can retrieve the media from a content management system or other dedicated media playback or streaming server, or the embedded client can retrieve the media from different components of the server and/or the playback service, such as a different daemon listening on a different port number. Once the embedded client has established a trusted relationship with the entity providing the media content for playback, such as establishing a client-side cookie to confirm the client's side of the trusted relationship, the embedded client can continue on to retrieve related media content or other media content with the same, similar, or corresponding permissions without renewing the trusted relationship or by a less rigorous authorization process.

FIG. 5 illustrates a third example method embodiment of securely providing media content to an embedded player from the perspective of a playback service 212 as shown in FIG. 2 that can be separate from a server handling the initial requests for media and from a server storing and actually serving the content. The playback service receives, from a server, a request for a playback token, wherein the server generates the request in response to an initial user request from a user for media playback (502).

The playback service generates the playback token for media content associated with the initial user or a server request (504). The playback service can generate the playback token based on a feed token associated with a token store and pre-shared with the server. The playback service transmits the playback token to the server in response to the request, and the server responds to the initial user request based on the playback token (506), such as by embedding the playback token in a tag. Then, the embedded media player is able to initiate the next phase of streaming the media content. The playback service receives, from the user, a media playback request for the media content (508). If the media playback request corresponds to the playback token, the playback service provides the user with access to the media content (510). Providing access to the media content to the user can include providing a media playlist having at least one media streaming address pointing to a content management system hosting the media content and a media streaming token authorizing the embedded media player to access the media content. If the media playback request does not correspond to the playback token, the playback service denies the user access to the media content (512). In one aspect, the request and the playback token correspond only when they are identical. However, in another aspect, only portions of the request and/or the playback token must match, or must fall within a range or set of acceptable values. The system can determine that the request and the playback token correspond to each other by performing a mathematical operation or transformation on one or both of the request, the playback token, and/or another secret or secured value.

Other embodiments may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods set forth above. The particular sequence of such executable instructions or associated data structures represents examples of corresponding acts for implementing the functions described in such steps.

Those of skill in the art will appreciate that other embodiments may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration. For example, the principles herein are applicable to delivering media content to a web browser on a desktop or laptop computer or to an app on a smartphone or tablet. The principles set forth herein are applicable to secure distribution of any form of digital media. Those skilled in the art will readily recognize various modifications and changes that may be made to the principles described herein without following the example embodiments and applications illustrated and described herein, and without departing from the spirit and scope.

We claim:

1. A computer-implemented method of processing media requests, the method comprising:

obtaining, by a web server, a pre-shared feed token comprising a cryptographic hash of a shared secret, the shared secret and the pre-shared feed token not exposed to a media player client;

receiving, at the web server from the media player client, a request for media content;

transmitting, from the web server to a playback server implementing a playback service, a request for a playback token, the request comprising an IP address associated with the media player client, a domain of the web server, an encrypted media identifier associated with the media content, and the pre-shared feed token, the pre-shared feed token matching a duplicate pre-shared feed token of the playback server;

receiving, at the web server from the playback server, the requested playback token, the received playback token generated by the playback server based on the pre-shared feed token;

generating, by one or more processors of the web server, a tag containing the playback token, the tag enabling the media player to retrieve the requested media content using the playback token; and transmitting, from the web server to the media player client, a response to the request for media content, the response comprising the tag, the media player client configured to request the media from the playback server using the playback token included in the tag.

2. The method of claim 1, wherein the request for the playback token further comprises at least one of a time limit and a user identifier.

3. The method of claim 2, wherein the playback token is generated based on the transmitted IP address of the media player client and at least one of the time limit, the domain of the web server, the user identifier, and the encrypted media identifier associated with the media content.

4. The method of claim 1, wherein the request for the media content is associated with a media consumption session comprising multiple discrete pieces of media content.

5. A computer-implemented method for authenticating a request for media content from a media player client, the method comprising:

obtaining, by a playback server implementing a playback service, a pre-shared feed token comprising a cryptographic hash of a shared secret, the shared secret and the pre-shared feed token not exposed to the media player client;

receiving, at the playback server from the web server, a request for a playback token for media content, the request comprising an IP address associated with the media player client, a domain of the web server, an encrypted media identifier associated with the media content, and a duplicate pre-shared feed token matching the pre-shared feed token obtained by the playback server, the request associated with the media player client;

generating, by one or more processors of the playback server, the playback token for the media content, the playback token generated based on the pre-shared feed token;

transmitting the playback token from the playback server to the web server in response to the request, the web server configured to transmit the playback token to the media player client;

receiving, at the playback server from the media player client associated with the request for the playback token, a media playback request for the media content, the media playback request comprising another playback token;

if the other playback token corresponds to the generated playback token, providing, by the playback server, access to the media content to the media player client; and if the other playback token does not correspond to the playback token, denying, by the playback server, the media player client access to the media content.

6. The method of claim 5, wherein providing access to the media content comprises providing a media playlist having at least one media streaming address pointing to a content management system hosting the media content and a media streaming token authorizing the media player client to access the media content.

7. The method of claim 5, further comprising:
restricting the media player client to play the media content according to a media identifier, the playback token, the IP address, and at least one of a time limit, the domain, and a user identifier associated with the media content.

8. The method of claim 5, further comprising:
establishing a session cookie on the media player client to authorize media playback of related media content for a limited time without authorizing each of the multiple discrete pieces of media content individually.

9. The method of claim 5, wherein the playback server determines a geographic location of the media player client and authorizes the media player client to play the media content based on the geographic location.

10. The method of claim 5, wherein generating the playback token comprises generating the playback token based on the pre-shared feed token, the encrypted media identifier, the IP address associated with the media player client, and the domain of the web server.

11. The method of claim 5, wherein providing the media player client access to the media content comprises:
retrieving, to the playback server and from a content management system storing the requested media content, a playlist comprising a stream address of the requested media content; and
providing, from the playback server to the media player client, the received playlist, the media player client configured to retrieve the media content using the stream address.

12. The method of claim 11, wherein the playlist includes a stream token associated with the stream address and used by the media player client to access the requested media item at the content management system.

13. The method of claim 5, wherein the requested media content is encrypted, and the playback server decrypts the requested media content before the media player client retrieves the media content pieces.

14. A system for authenticating a request for media content from a media player client, the system comprising:
a feeds server implementing a feeds service, the feed server configured to:
obtain a pre-shared feed token comprising a cryptographic hash of a shared secret, the shared secret and the pre-shared feed token not exposed to the media player client; and
provide a first copy of the pre-shared feed token to a web server receiving the request for media content from the media player client;
a playback server implementing a playback service, the playback service configured to:
obtain, from the feeds server, a second copy of the pre-shared feed token;
receive, from the web server, a request for a playback token for media content, the request comprising an IP address associated with the media player client, a domain of the web server, an encrypted media identifier associated with the media content, and the first copy of the pre-shared feed token, the first copy of the pre-shared feed token corresponding to the second copy of the pre-shared feed token;
generate, by one or more processors of the playback server, the playback token for the media content, the playback token generated based on the pre-shared feed token;
transmit the playback token to the web server in response to the request, the web server configured to transmit the playback token to the media player client;
receive, from the media player client associated with the request for the playback token, a media playback request for the media content, the media playback request comprising another playback token; and
if the other playback token corresponds to the generated playback token,
retrieve a playlist comprising a stream address of the requested media content and a stream token associated with the stream address, and
transmit, to the media player client, the playlist comprising the stream address of the requested media content and the stream token; and a content management server storing the requested media content, the content management server configured to:
provide the stream address and the stream token to the playback server;
provide the requested media content to the media player client in response to verifying that another stream token received from the media player client corresponds to the stream token provided to the playback server.

* * * * *